United States Patent [19]
Glocker et al.

[11] Patent Number: 4,877,690
[45] Date of Patent: Oct. 31, 1989

[54] MAGNETOOPTICAL RECORDING ELEMENT

[75] Inventors: David A. Glocker, W. Henrietta; Tukaram K. Hatwar, Penfield; both of N.Y.; Gregory Lynn McIntire, West Chester, Pa.; Srinivas T. Rao, Los Gatos, Calif.; Douglas G. Stinson, Fairport, N.Y.

[73] Assignee: Eastman Kodak Company, Rochester, N.Y.

[21] Appl. No.: 317,401

[22] Filed: Mar. 1, 1989

[51] Int. Cl.$^4$ .................................................. G11B 7/24
[52] U.S. Cl. ..................................... 428/627; 428/632; 428/661; 428/678; 428/928
[58] Field of Search ............... 428/928, 611, 615, 623, 428/627, 632, 678, 668, 681, 660, 661, 662, 686; 365/122

[56] References Cited

U.S. PATENT DOCUMENTS

| | | | |
|---|---|---|---|
| 4,390,600 | 6/1983 | Ohta et al. | 428/621 |
| 4,489,139 | 12/1984 | Ohta et al. | 428/621 |
| 4,615,944 | 10/1986 | Gardner | 428/332 |
| 4,666,789 | 5/1987 | Gueugnon et al. | 428/668 |
| 4,690,861 | 9/1987 | Nakamura et al. | 428/627 |
| 4,719,154 | 1/1988 | Hatwar | 428/694 |
| 4,740,430 | 4/1988 | Frankenthal et al. | 428/678 |
| 4,777,082 | 10/1988 | Ishizaki et al. | 428/678 |

FOREIGN PATENT DOCUMENTS

| | | | |
|---|---|---|---|
| 3623285A1 | 1/1987 | Fed. Rep. of Germany | 365/122 |
| 60-243844 | 12/1985 | Japan . | |
| 61-068748 | 1/1986 | Japan . | |
| 61-172236 | 8/1986 | Japan . | |
| 61-276150 | 12/1986 | Japan . | |
| 62-014348 | 1/1987 | Japan . | |
| 62-232738 | 10/1987 | Japan . | |
| 63-113835 | 5/1988 | Japan . | |

*Primary Examiner*—John J. Zimmerman
*Attorney, Agent, or Firm*—Robert A. Gerlach

[57] ABSTRACT

A magnetic optical recording element including a rare earth-transition metal recording layer, a barrier layer and a self-passivating active metal layer.

10 Claims, 1 Drawing Sheet

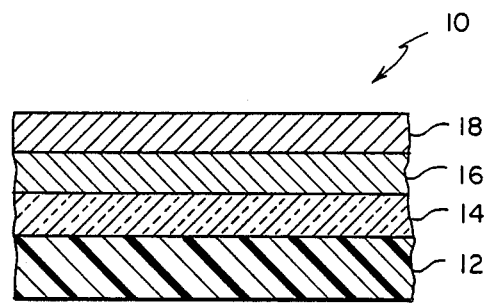
FIG. I

MAGNETOOPTICAL RECORDING ELEMENT

BACKGROUND OF THE INVENTION

Field of the Invention

This invention relates to magnetooptical recording elements. More particularly it relates to magnetooptical recording elements having greater reliability, improved resistance to corrosion, improved physical stability under varying temperature conditions, are readily manufactured by simplified techniques and which demonstrate a satisfactory carrier to noise ratio.

In magnetooptic recording devices, rare earth transition metal alloys have been prominently named as suitable materials to achieve a high rotation angle of the planarized laser light, whether the system utilizes the Kerr effect or the Faraday effect. These materials are highly corrosive in air and therefore must be protected by layers disposed adjacent to the rare earth transition metal recording layer.

It has been proposed to utilize in this regard ceramic layers such as, for example, aluminum nitride, silicon nitride, silicon oxides, aluminum oxides, and the like. Such layers are suitable for use in magnetooptical recording elements employing either the Kerr effect or Faraday effect as they are generally transmissive to laser light. However, they suffer the disadvantage that they are difficult to deposit on the surface of the magnetooptic layer in a reliable fashion.

It has also been known to provide a protective layer on the magnetooptic layer by utilizing an active metal that forms a passivating layer including chromium, zirconium, molyldenum, tungsten, tantalum, vanadium, hafnium, titanium, aluminum, magnesium, zinc and the like. Such layers, while they improve the corrosion and oxidation resistance of the magnetooptic layer, suffer from disadvantages including reduction in the carrier to noise ratio because of the transmissivity of the particular material employed and also in that many of these materials interfere with the precise recording of the magnetooptic layer because of the thermal conductivity of the material which spreads out the heat imparted by the recording laser over too broad an area. Thus, each of the two types of corrosion preventive layers suffers because of the inherent disadvantages due to the nature of the material itself.

SUMMARY OF THE INVENTION

This invention provides a magnetooptical recording element comprising an assembly of layers including a rare earth transition metal recording layer having on one surface a ceramic barrier layer and on the other surface a self-passivating active metal layer having a thermal conductivity substantially equivalent to that of the ceramic barrier layer, the assembly of layers being supported on a substrate.

Thus, the invention contemplates a magnetooptical recording element having a ceramic barrier layer on one surface of the rare earth transition metal recording layer and a self-passivating active metal layer on the other surface of the recording layer where either the ceramic barrier layer or the self-passivating active metal layer is disposed contiguous to and adjacent the substrate. When the ceramic barrier layer is adjacent the substrate, the magnetooptic recording layer is addressed by the read and write laser of the magnetooptic device through the substrate and when the self-passivating active metal layer is disposed adjacent the substrate, the magnetooptic recording layer is addressed by the read and write laser from the side opposite that of the substrate. In a magnetooptical recording element of this invention, only the Kerr effect is employed.

BRIEF DESCRIPTION OF THE DRAWING

The sole FIGURE is a diagrammatic view of a cross section of a magnetooptic recording element in accordance with this invention.

DETAILED DESCRIPTION OF PREFERRED EMBODIMENTS

Referring to the figure, a magnetooptical element 10 includes a substrate 12 having disposed thereon a layer 14 which, for the purposes of this present discussion, will be termed a ceramic barrier layer. A magnetooptical recording layer 16 is disposed immediately over and adjacent to the barrier layer 14 and on the free surface of the magnetooptical recording layer 16 is disposed a self-passivating active metal layer which has a thermal conductivity substantially equivalent to that of the ceramic barrier layer 14. In the embodiment as shown, the magnetooptical layer 16 is addressed by the read and write lasers of the theremo-magnetooptical system through the substrate 12.

As indicated previously, the positions of the ceramic barrier layer and the self-passivating active metal layer may be reversed with the self-passivating barrier layer 18 being adjacent to the substrate 12 and the ceramic barrier layer on the free surface of the magnetooptical layer 16. In this instance, the magnetooptical layer 26 is addressed by the read and write laser from the free side of the recording element, that being the side away from the substrate.

With regard to the substrate, any suitable material may be employed in the preparation thereof including glass, polymethylmethacrylate resins, polycarbonate resins, polyethylene terephthalate polyester resins, and suitable non-magnetic metal such as, aluminum, copper and the like. When the magnetooptical layer is addressed through the substrate, it is essential that the substrate be transparent. When layer 14 is a ceramic barrier layer, any suitable material may be employed such as, for example, nitrides, carbides and oxides of aluminum, silicon, titanium and boron. Of these materials, aluminum nitride is highly preferred because it possesses excellent characteristics to serve both as a corrosion preventative layer as well as an anti-reflective layer which improves the Kerr rotation angle of the magnetooptical layer 16. The ceramic barrier layer 14 may be applied by any suitable technique including that disclosed in U.S. Pat. No. 4,719,194 issued to T. K. Hatwar, Jan. 12, 1988 and assigned to the same assignee as this application, this patent being incorporated herein by reference.

Any suitable rare earth-transition metal alloy that exhibits the Kerr magnetooptic effect may be employed as layer 16 such as, for example, terbium iron, dysprosium iron, gadolinium terbium iron, gadolinium terbium dysprosium iron, gadolinium cobalt, terbium iron cobalt or the like. Of these materials terbium iron cobalt alloys are preferred for use as the magnetooptical layer 16 because of the large Kerr rotation angle that results and also because of the Curie temperature that can be obtained using these particular alloy compositions. Any suitable technique for applying the magnetooptical layer to the previously applied layer may be employed such as that disclosed in previously mentioned U.S. Pat. No. 4,719,194 and in U.S. Pat. No. 4,670,353 issued June 2, 1987, both of which are incorporated herein by reference.

Regarding the self-passivating active metal layer, shown as reference character 18 in the figure, any active metal or metal alloy that is self-passivating and has a thermal conductivity substantially equivalent to that employed in the ceramic barrier layer may be used such as, for example, titanium, zirconium, vanadium, alloys of any of these materials with other materials and the like may be used. Particular alloy materials that may be employed are titanium-molybdenum, titanium-vanadium, titanium-zirconium and the like. In addition to having a thermal conductivity approximating that of the ceramic barrier layer, the material from which the self-passivating layer as prepared should have a low heat capacity, that is a heat capacity less than 0.2 cal/gm degree C and a low thermal conductivity, that is a thermal conductivity less than 0.5 watts/cm degree C. Layer 18 should be of a thickness such that it is opaque and that the self-passivating layer which forms has a thickness of approximately 0.01 microns. This will result when the total thickness of layer 18 is from about 0.04 to 0.20 microns. The self-passivating active layer may be applied by any suitable technique including sputtering, evaporation and the like.

The invention is further illustrated by the following examples:

EXAMPLE

A series of sixteen 88 mm diameter injection molded polycarbonate disks having a thickness of 1.2 mm were baked in an oven at a temperature of 60 degree C. for four hours and then inserted into a vacuum system which was then pumped to a pressure of $10^{-6}$ Torr. Oxygen was introduced into the system to achieve a pressure of 10 mTorr and an RF plate actuated to cause a glow discharge, the coil energized by a power of 50 watts for 100 seconds at which time it was de-energized. The vacuum system was then pumped to at least a pressure of $10^{-6}$ Torr and argon gas was introduced to a partial pressure of 1.5 mTorr. An aluminum sputtering target was ignited at a power of 6.6 kW by a standard DC magnetron power supply. Nitrogen was then introduced at a flow rate that produced a nitrogen partial pressure of 0.5 mTorr and the argon and nitrogen partial pressures were maintained during sputtering. These conditions resulted in a deposition rate of approximately 6.0 nm per second.

The polycarbonate disks were scanned over the sputtering target at a speed of 54 cm/min to yield an aluminum nitride layer of 80 nm.

An 80 nm layer of terbium-iron-cobalt alloy was DC sputtered onto all sixteen disks previously coated with aluminum nitride. To do this, the nitrogen flow was stopped, and the argon flow was adjusted to produce a pressure of 3.0 mTorr. The target was activated at a power of 900 watts and the disks were scanned past the target at a speed which produced a thickness of 80 nm for the terbium-iron-cobalt.

The sixteen disks as coated were divided in half. Eight were coated with titanium and 8 with aluminum nitride (controls) in a manner similar to the above except that two disks were coated with a 200 Angstroms aluminum nitride layer, two with a 400 Angstroms aluminum nitride layer two with an 800 Angstroms aluminum layer and two with a 1600 Angstroms aluminum nitride layer. The eight coated with titanium also have two each with a titanium layer in the same thickness range as the aluminum nitride controls. Thus two contain a titanium layer of 200 Angstroms, two a 400 Angstroms titanium layer, two an 800 Angstroms titanium layer and two a 1600 Angstroms titanium layer. The titanium layers were DC sputtered by first pumping the vacuum chamber to a pressure of at least $10^{-6}$ Torr. Argon gas was introduced at the flow needed to produce a pressure of 10 mTorr. A titanium target was energized at a power of 4.0 kW, which produced a rate of 7.0 nm/sec. The disks were scanned past the target at speeds calculated to give the desired thickness.

The sixteen disks were tested to determine their recording capability by measuring their threshold write powers through the substrate at media velocities of 10.3 m/s and 6.2 m/s with a carrier frequency of 1 MHz. At both media velocities the performances of the aluminum nitride overcoated disks and the titanium overcoated disks were indistinguishable.

In order to demonstrate the corrosion protection afforded by the titanium overcoats, bare terbium-iron-cobalt coated slides and slides coated with terbium-iron-cobalt and a titanium overcoat were immersed in a 0.1M KCl/chloroacetate buffer solution. The optical absorption of the package was measured as a function of time. The absorption of the unprotected terbium-iron-cobalt fell to 10% of its original value in about 12,000 seconds, indicating substantial chemical attack. In contrast, the absorption of the titanium overcoated sample was virtually unchanged out to 48,000 seconds.

What is claimed is:

1. A magnetooptical recording element which comprises an assembly of layers including a rare earth, transition metal recording layer having on one surface a ceramic barrier layer and on the other surface a self-passivating active metal layer having a thermal conductivity substantially equivalent to that of the ceramic barrier layer, said assembly of layers being supported on a substrate.

2. The recording element of claim 1 wherein the ceramic barrier layer is nitride or carbide of aluminum, silicon, titanium or boron.

3. The recording element of claim 1 wherein the self-passivating layer is titanium, zirconium, vanadium or alloys thereof.

4. The recording element of claim 1 wherein the rare earth, transition metal layer is a terbium iron cobalt alloy.

5. The recording element of claim 2 wherein the ceramic barrier layer is aluminum nitride.

6. The recording element of claim 3 wherein the self-passivating layer is titanium.

7. A magnetooptical recording element which comprises an assembly of layers including a recording layer of terbium iron cobalt, an aluminum nitride layer on one surface and a self-passivating titanium layer on the other surface, said assembly of layers being supported on a substrate.

8. The recording element of claim 7 wherein the aluminum nitride layer is disposed adjacent the substrate.

9. The recording element of claim 7 wherein the self-passivating titanium layer is disposed adjacent the substrate.

10. The recording layer of claim 8 wherein the substrate is transparent.

* * * * *